United States Patent [19]

Martinelli

[11] Patent Number: 5,715,781
[45] Date of Patent: Feb. 10, 1998

[54] VARIABLE-CAPACITY INTAKE SYSTEM FOR A VEHICLE INTERNAL COMBUSTION ENGINE

[75] Inventor: Paolo Martinelli, Modena, Italy

[73] Assignee: Ferrari S.P.A., Modena, Italy

[21] Appl. No.: 734,387

[22] Filed: Oct. 17, 1996

[30] Foreign Application Priority Data

Oct. 17, 1995 [IT] Italy ................... TO95A0836

[51] Int. Cl.⁶ ............................................ F02M 35/10
[52] U.S. Cl. .............................. 123/184.36; 123/184.53
[58] Field of Search ..................... 123/184.53, 184.35, 123/184.36

[56] References Cited

U.S. PATENT DOCUMENTS

| | | | |
|---|---|---|---|
| 4,809,647 | 3/1989 | Masumoto et al. | 123/184.36 |
| 4,957,071 | 9/1990 | Matsuo et al. | 123/184.36 |
| 5,000,129 | 3/1991 | Fukada et al. | 123/184.36 |
| 5,005,536 | 4/1991 | Suzuki et al. | 123/184.35 |
| 5,048,471 | 9/1991 | Takii et al. | 123/184.36 |
| 5,127,370 | 7/1992 | Suzuki et al. | 123/184.35 |

*Primary Examiner*—David A. Okonsky
*Attorney, Agent, or Firm*—Shlesinger Arkwright & Garvey LLP

[57] ABSTRACT

A variable-capacity intake system for a vehicle internal combustion engine, and of the type presenting: a first and second reservoir connected to common air supply means; at least a first intake conduit connecting the first reservoir to a respective cylinder of a corresponding first block; at least a second intake conduit connecting the second reservoir to a respective cylinder of a corresponding second block; respective branches connecting the first intake conduit to the second reservoir and the second intake conduit to the first reservoir; and valve means for selectively connecting each reservoir to one of the intake conduits.

5 Claims, 2 Drawing Sheets

VARIABLE-CAPACITY INTAKE SYSTEM FOR A VEHICLE INTERNAL COMBUSTION ENGINE

BACKGROUND OF THE INVENTION

The present invention relates to a variable-capacity intake system for an internal combustion engine, in particular a high-performance GT car engine.

As is known, it is possible to enhance the volumetric efficiency of an internal combustion engine using a system, which provides for varying intake conditions and optimizing engine filling by determining resonance conditions in the system at different engine speeds. Increasing the volumetric efficiency of the engine provides to a certain extent for increasing power output for a given engine speed, reducing fuel consumption by burning the fuel better, and hence reducing the amount of pollutant exhaust gas produced.

The state of the art is familiar with intake systems for internal combustion engines, especially those of high-performance, e.g. GT, cars, in which the air intake conduits comprise so-called "trumpet" elements designed to vary their length to diameter ratio and so vary the intake conditions of the engine. Such elements are substantially of two types: a first presents a telescopic end conduit portion defined by two coaxial elements sliding one inside the other and which, by varying their axial position in relation to each other, provide for varying the length to diameter ratio (the length increasing or decreasing, and the diameter remaining constant); and a second presents an inlet portion comprising a pair of semicylindrical lobes hinged to each other and laterally superimposed to define a continuous-section conduit portion variable in diameter according to the extent to which the two lobes are parted.

In the case of engines with no trumpet elements, use is made, for each cylinder, of two parallel intake conduits of appropriate length and diameter and end-connected by a manifold fitted inside with a throttle valve. By controlling the throttle valve, it is possible to use either one or both of the conduits, thus changing the "equivalent diameter" of the resulting intake conduit, and so achieve resonance conditions for a given number of different engine speeds.

The above systems present the drawback of being relatively bulky and expensive; and the first, featuring telescopic trumpet elements, is also relatively delicate in terms of mechanical control.

SUMMARY OF THE INVENTION

It is an object of the present invention to provide a variable-capacity intake system for optimizing engine filling by determining resonance conditions in the system at predetermined engine speeds, and which at the same time is of straightforward, robust design, and ensures a high degree of reliability.

According to the present invention, there is provided a variable-capacity intake system for a vehicle internal combustion engine, and of the type comprising a first and second reservoir connected to common air supply means; at least a first intake conduit connecting the first reservoir to a respective cylinder of a corresponding first block; and at least a second intake conduit connecting the second reservoir to a respective cylinder of a corresponding second block; characterized by also comprising respective branches connecting each said first conduit to the second reservoir, and each said second conduit to the first reservoir; and valve means for selectively connecting each said reservoir to said first and second intake conduits.

Being straightforward in design, the above variable-capacity intake system is therefore highly reliable, inexpensive and compact, and also provides for optimizing engine filling by determining resonance conditions in the system at predetermined engine speeds.

BRIEF DESCRIPTION OF THE DRAWINGS

Two non-limiting embodiments of the present invention will be described by way of example with reference to the accompanying drawings, in which.

DETAILED DESCRIPTION OF THE INVENTION

Figure 2:
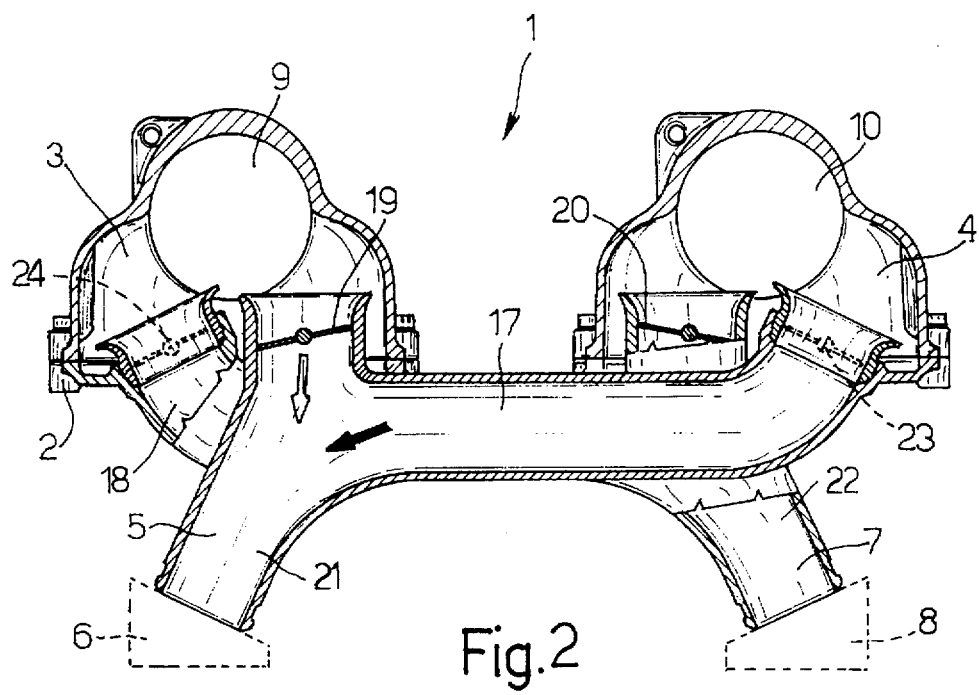
FIG. 2 shows a section along line II—II in FIG. 1.
Figure 1:
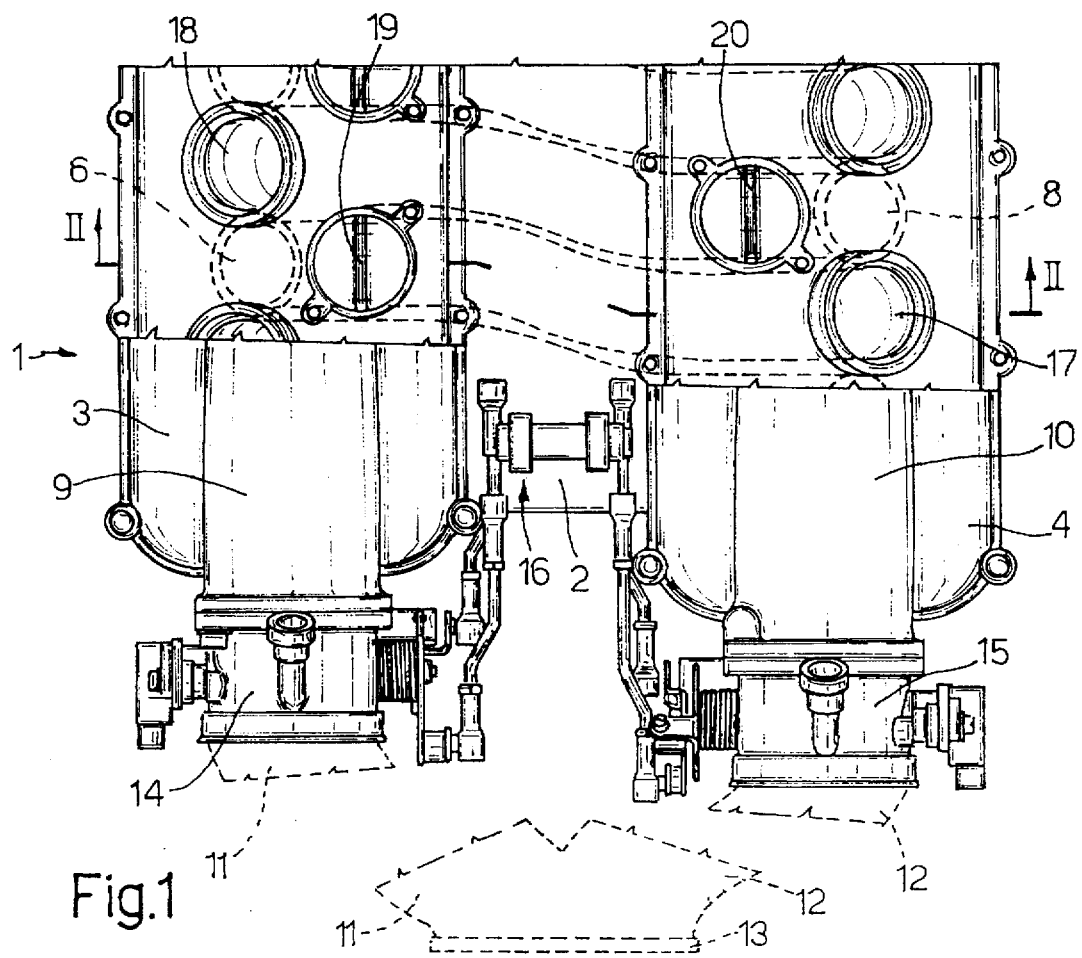
FIG. 1 shows a schematic top plan view of a variable-capacity intake system for a vehicle internal combustion engine in accordance with the present invention.

Number 1 in FIGS. 1 and 2 indicates a variable-capacity intake system for an otherwise known internal combustion engine (not shown) of any known type of vehicle (not shown), e.g. a GT car. Intake system 1 is fitted to the cylinder head 2 of the engine, and comprises a first and second reservoir 3 and 4 located facing each other on either side of cylinder head 2.

Intake system 1 also comprises one or more first intake conduits 5, each connecting reservoir 3 to a respective cylinder of a corresponding first block 6; and one or more second intake conduits 7, each connecting second reservoir 4 to a respective cylinder of a corresponding second block 8. Blocks 6 and 8, which present in-line cylinders of which only one cylinder per block is shown in the accompanying drawings, are located parallel to and beneath reservoirs 3 and 4, and may be arranged in a V or power separate drive shafts. Reservoirs 3, 4 are also connected in known manner to respective air manifolds 9, 10 communicating with conduits 11, 12, for connection to an air filter 13, via throttled bodies 14, 15 opened and closed continuously by a known electromechanical system 16 controlled by the accelerator pedal of the vehicle.

According to the present invention, intake conduits 5, 7 are Y-shaped, and comprise respective opposite branches 17, 18 comprising respective curved branches of conduits 5, 7 and connecting each first conduit 5 to second reservoir 4 and each second conduit 7 to first reservoir 3; branches 17, 18 are oppositely oriented to cross-over one another (FIG. 2); and the inlet of each intake conduit 5, 7 connected to the respective reservoir 3, 4 presents ON/Off valve means 19, 20 comprising a throttle valve in the preferred embodiment shown.

In the example shown in FIGS. 1 and 2, each intake conduit 5, 7 also comprises a substantially straight branch 21, 22 connecting the relative reservoir 3, 4 to the relative block 6, 8, and which is connected to respective branch 17, 18 and presents an axis inclined in relation to the axis of respective branch 17, 18 at the connecting point; and the inlet sections of branches 17, 18 connected to respective reservoirs 4, 3 are substantially inclined in relation to the axes of relative manifolds 10, 9.

Finally, reservoirs 3, 4, branches 17, 18 and conduits 5, 7 are defined by respective cavities in cylinder head 2; and valves 19, 20 are all controlled together by a single shaft (not shown).

In actual use, when valves 19, 20 are closed (as shown), conduits 5 of block 6 are cut off from reservoir 3 and communicate with reservoir 4 via branches 17 (FIG. 2). The same also applies to reservoir 4. For block 6, therefore, the volume of intake system 1 involved in the intake stroke equals the volume of reservoir 4 plus the volume of the whole formed by branch 21 of respective intake conduit 5, which is closed, and by respective branch 17, and vice versa for block 8. At the design stage, therefore, reservoirs 3, 4, intake conduits 5, 7 and branches 17, 18 may be so sized as to determine resonance conditions in system 1 at a predetermined engine speed and so optimize the efficiency of the engine at that speed.

When valves 19, 20 are opened (simultaneously or separately), the total volume of system 1 communicating with each block 6, 8 increases by an amount equal to the volume of reservoir 3, 4 over the respective block, thus varying the resonance conditions; and the volumes of reservoirs 3, 4 may of course be so calculated as to determine resonance conditions, this time, at a different engine speed, thus achieving optimum intake conditions at two different engine speeds by simply opening/closing valves 19, 20 as a function of the engine speed.

According to one variation, valve means 19, 20 may be fitted to the inlets of branches 17, 18 connected to respective reservoirs 4, 3, .as opposed to inside intake conduits 5, 7, the choice obviously depending on the resonance conditions desired during intake and opted for at the design stage.

According to a further variation, in addition to valve means 19, 20 inside intake conduits 5, 7 as described above, a further pair of ON/OFF valve means 23, 24 (shown by the dotted line in FIG. 2) may be fitted to the inlets of branches 17, 18 connected to respective reservoirs 4, 3, so as to achieve optimum resonance conditions for at least three different predetermined engine speeds: a first adjustment with valves 19, 20, 23, 24 all open; a second adjustment by closing valves 19, 20 so that blocks 6, 8 are supplied exclusively by branches 17, 18, i.e. along paths with a high length to diameter ratio; and a third adjustment by closing valves 23, 24 and opening valves 19, 20, so that blocks 6, 8 are supplied along "short" paths defined by conduits 5, 7 with a smaller length to diameter ratio.

Figure 3:
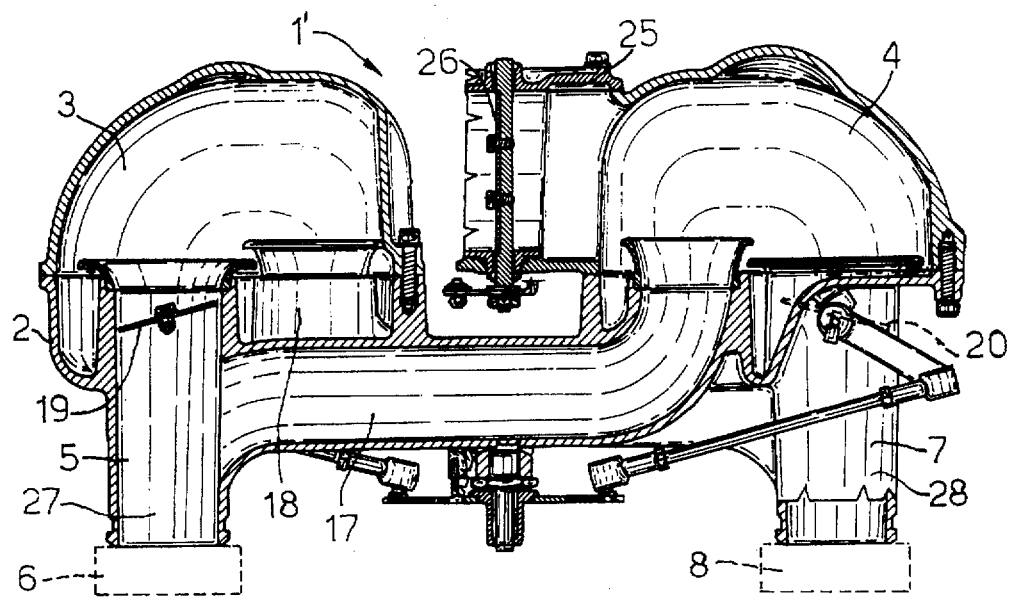
FIG. 3 shows a section of a further embodiment of a variable-capacity intake system for a vehicle internal combustion engine in accordance with the present invention.
Figure 4:
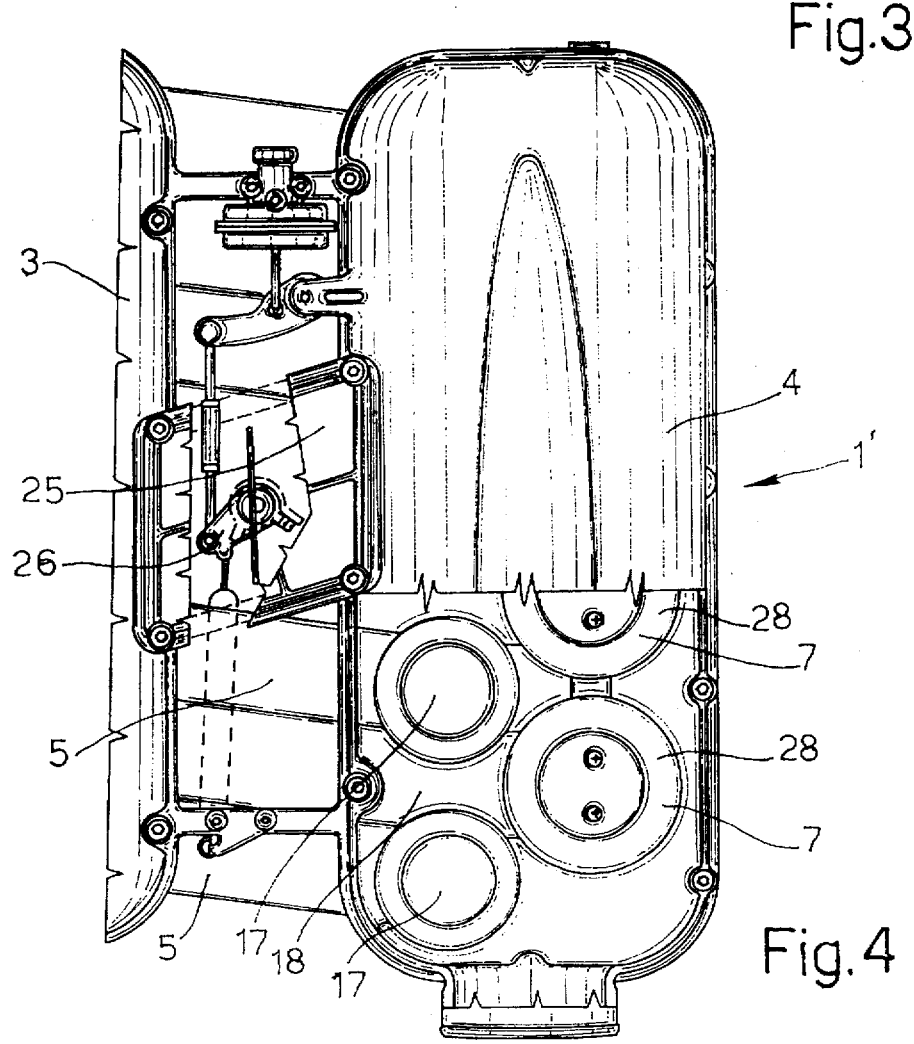
FIG. 4 shows a schematic top plan view, with parts removed for clarity, of the intake system in FIG. 3.

FIGS. 3 and 4 show a further embodiment of a variable-capacity intake system for an internal combustion engine in accordance with the present invention and indicated as a whole by 1'. Wherever possible, the component parts of system 1' are indicated using the same reference numbers as for the corresponding parts of system 1.

System 1' differs from system 1 by comprising a further conduit 25 connecting reservoirs 3 and 4; and ON/OFF valve means 26 housed inside conduit 25 and comprising a throttle valve in the preferred embodiment shown.

Moreover, each intake conduit 5, 7 comprises a substantially straight branch 27, 28, which differs from branch 21, 22 by presenting an axis substantially perpendicular to the axis of respective branch 17, 18 at the point of connection to branch 27, 28; and the inlet sections of branches 17, 18 are connected to respective reservoirs 4, 3 are substantially perpendicular to the axes of respective branches 28, 27.

In actual use, when valve means 26 are opened, the total volume of system 1' communicating with each block 6, 8 increases by an amount equal to the volume of reservoir 4, 3 over the adjacent block 8, 6, thus varying the resonance conditions; and the volumes of reservoirs 3, 4 may of course be so calculated as to determine resonance conditions at an engine speed other than those of system 1.

Clearly, changes may be made to intake systems 1 and 1' as described and illustrated herein without, however, departing from the scope of the present invention.

I claim:
1. A variable-capacity intake system (1) for a vehicle internal combustion engine, and of the type comprising:
   (a) first (3) and second (4) reservoirs connected to a common air supply means;
   (b) at least a first intake conduit (5) connecting said first reservoir (3) to a respective cylinder of a corresponding first block (6);
   (c) at least a second intake conduit (7) connecting said second reservoir (4) to a respective cylinder of a corresponding second block (8);
   (d) respective branches (17, 18) connecting each said at least first conduit (5) to said second reservoir (4), and each of said at least second conduit (7) to said first reservoir (3);
   (e) and, first valve means (19, 20, 23, 24) for selectively connecting each of said first and second reservoirs (3, 4) to said at least first and second conduits (5, 7); and wherein in combination;
      (i) the ends of said respective branches (17, 18) and said at least first and second conduits (5, 7) project inside said reservoirs (3, 4);
      (ii) said first valve means (19, 20, 23, 24) are ON/OFF type valves;
      (iii) said system (1) further comprising:
         (a) a second valve means (14, 15) for continuously regulating the air flow in said reservoirs (3, 4) from said common air supply means;
         (b) a conduit (25) connecting said first and second reservoirs (3, 4) and
         (c) an interception valve means (26), said interception valve means is an ON/OFF type valve in series with said conduit connecting said first and second reservoirs;
         (d) whereby said conduits (5, 7, 25) and said reservoirs (3, 4) being designed for selectively obtaining different resonance conditions in said intake system (1) in response to the opening and closing of said first valve means and said interception valve means (19, 20, 23, 24, 26) of the ON/OFF types for selectively connecting said conduits (5, 7, 25) and said reservoirs (3, 4) therebetween in different manners.

2. A variable-capacity intake system as claimed in claim 1, characterized in that the reservoirs (3, 4) are located on either side of a cylinder head (2), each at and over a respective said block (6, 8); and in that the intake conduits (5, 7) are Y-shaped, said branches (17, 18) comprise respective curved branches of said Y-shaped intake conduits (5, 7), and said curved branches are oppositely oriented to connect each reservoir (4, 3) to the cylinders of the opposite block (6, 8).

3. A variable-capacity intake system as claimed in claim 1, characterized in that said first valve means (19, 20, 23, 24) are throttle valves fitted both to the inlet of each of said at least first and second intake conduit (5, 7) connected to the corresponding one of said reservoirs (3, 4) and to the inlet of each of said respective branches (17, 18) connected to the corresponding one of said reservoirs (4, 3).

4. A variable-capacity intake system as claimed in claim 1, characterized in that said reservoirs (3, 4), said intake conduits (5, 7) and said branches (17, 18) are defined by respective cavities in said cylinder head (2).

5. A variable-capacity intake system as claimed in claim 1, wherein said interception valve means (26) comprise a throttle valve housed inside said connecting conduit (25).

* * * * *